Figures 1, 2:
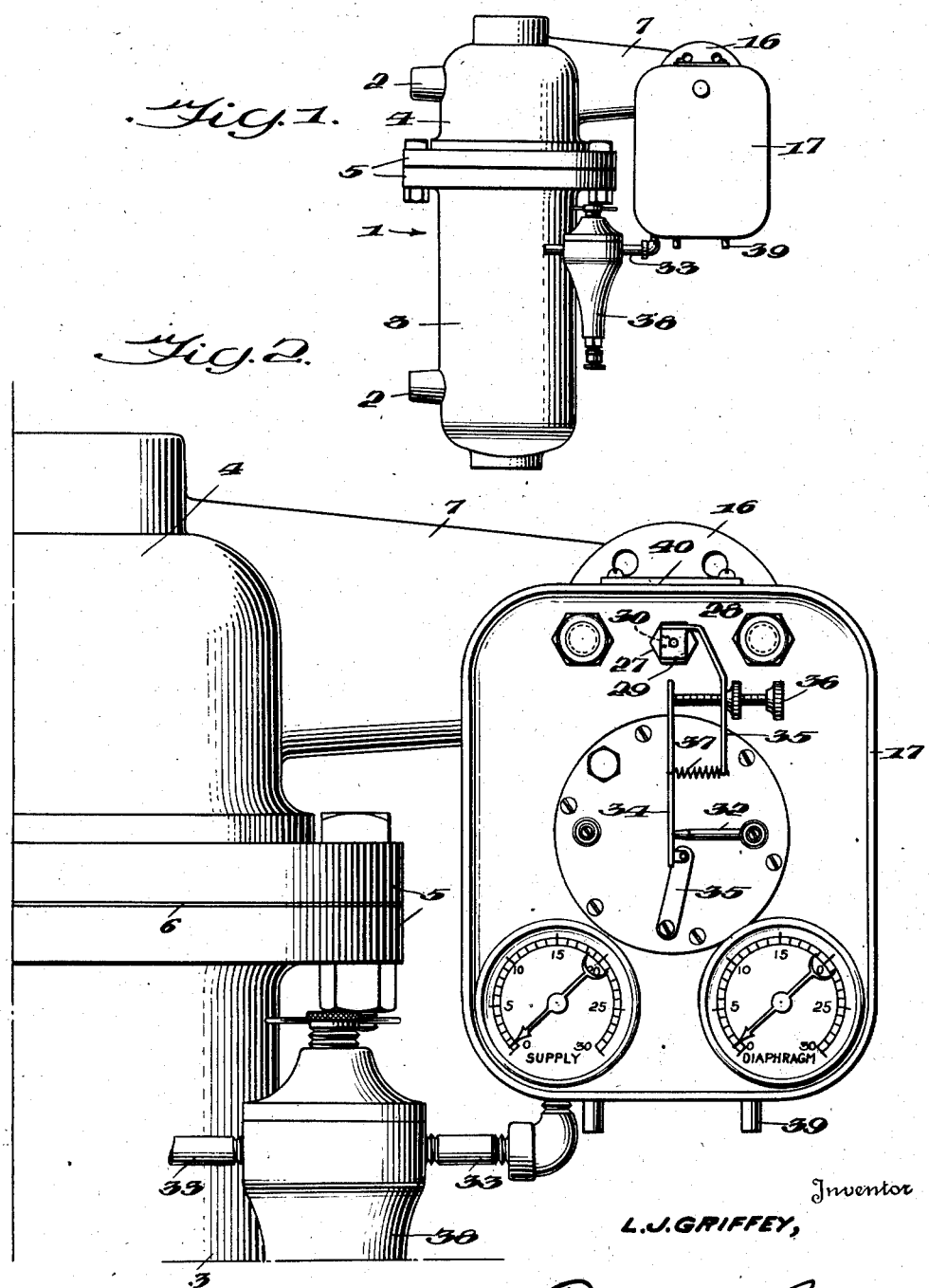

Nov. 25, 1941.　　　L. J. GRIFFEY　　　2,263,771
LIQUID LEVEL CONTROLLER
Filed Aug. 17, 1940　　　2 Sheets-Sheet 1

Inventor
L. J. GRIFFEY,
By Prindt & Prindt
Attorneys

Nov. 25, 1941.  L. J. GRIFFEY  2,263,771
LIQUID LEVEL CONTROLLER
Filed Aug. 17, 1940  2 Sheets-Sheet 2
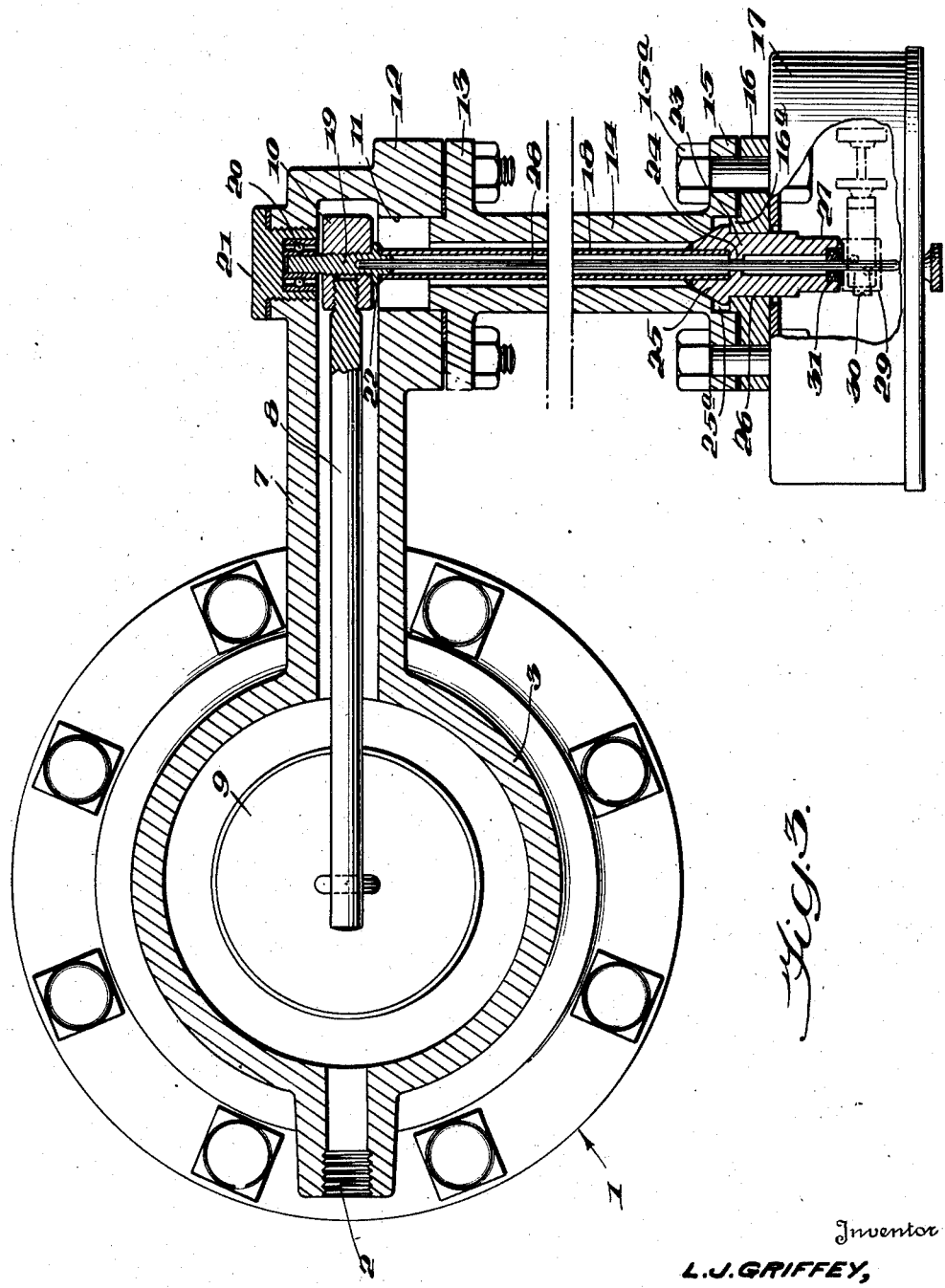
Inventor
L. J. GRIFFEY, Patented Nov. 25, 1941

2,263,771

UNITED STATES PATENT OFFICE 2,263,771

LIQUID LEVEL CONTROLLER

Leon J. Griffey, Tulsa, Okla., assignor to Hanlon-Waters, Inc., Tulsa, Okla.

Application August 17, 1940, Serial No. 353,116

8 Claims. (Cl. 137—68)

My invention consists in new and useful improvements in a liquid level controller and has for its object to provide a device of this character wherein the weight and displacement of a float governs the operation of the unit through the medium of a torsion tube assembly operatively connected to a suitable pilot valve.

Another object of the invention is to eliminate the necessity of packing glands and stuffing boxes ordinarily employed in liquid level control mechanisms wherein the shaft which operatively connects the float to the valve mechanism, extends through a wall of the liquid receptacle or container.

A further object of the present invention resides in the novel means for adjusting the torque of the torsion tube assembly and maintaining such adjustment.

It is another object of my invention to provide a liquid level controller which is so designed as to be completely unresponsive to pressure changes within the vessel being controlled, thus eliminating the necessity of employing pressure compensating means in installations which are subjected to pressure variations.

A still further object of my invention is to provide a float controlled liquid level regulator which employs no pivoted links, levers, or other frictional connecting members between the float and the valve being controlled. By directly connecting the float and the pilot valve, I not only eliminate friction, but provide a maximum of sensitivity and accuracy of operation.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views, Fig. 1 is a view in side elevation showing the float cage and pilot valve, Fig. 2 is an enlarged view showing the pilot valve with its front cover removed to illustrate the valve rod connecting means, and Fig. 3 is a transverse sectional view taken through the float cage and torsion tube housing with the pilot valve casing partially broken away to show the valve rod connection and torque adjusting means.

In the drawings 1 represents a float cage which may be connected to any suitable receptacle or container wherein it is desired to control the level or the specific gravity of the liquid therein; the usual equalizing connections 2 being provided adjacent the upper and lower extremities of the float cage for this purpose. In the form of my invention shown in the drawings, the float cage consists of two parts, a body 3 and a housing 4 connected by suitable flanges 5 bolted together with a gasket 6 therebetween as shown in Fig. 2.

The housing 4 is provided with an integral float arm housing 7 projecting laterally therefrom and adapted to accommodate a float arm 8 which extends into the housing 4 at one end where it is connected to a suitable float 9 which is suspended in the float cage. The opposite end of the float arm 8 is threaded to engage a complementary threaded opening in a float arm connecter 10 disposed adjacent the outer end of the float arm housing 7.

The outer end of the float arm housing is provided in one side wall with an opening 11 bounded by a boss 12 to which is bolted the flange 13 of a torsion tube housing 14. The opposite end of the latter is flanged as at 15 whereby it is secured by bolts 15a to a complementary flange 16 on the pilot valve casing 17 hereinafter referred to more in detail.

A torsion tube 18 extends through the housing 14 and is connected at one end to an adaptor 19 which is threaded intermediate its ends to engage complementary threads in the float arm connecter 10. The adaptor 19 projects through and beyond the connecter 10 and engages a ball bearing assembly 20 disposed in a retaining block 21 which is screwed into a suitable opening in the side wall of the float arm housing 7 directly in line with the opening 11 in the opposite wall. The end of the torsion tube 18 fits snugly over the end of the adaptor 19 and abuts a radial collar or flange 22 on said adaptor to which it is welded or otherwise rigidly secured.

The opposite end of the torsion tube 18 preferably fits into a longitudinal bore in an anchor block 23 and abuts an internal shoulder 24 in said bore, said shoulder serving the additional purpose of a grease retainer. The torsion tube is welded to the outer end of the anchor block 23 so as to provide a rigid connection, said outer end of the anchor block being preferably substantially conical in shape as shown at 25 in Fig. 3 to fit into a complementary opening in the adjacent end of the torsion tube housing 14. A ground joint is provided between the conical end of the anchor block and the engaging portion of the tube housing whereby a fluid tight seal is insured between the interior of the torsion tube housing and the pilot valve casing 17. The anchor block 23 is preferably reduced at its opposite end to fit closely into an opening 26 in the flange 16 of the pilot valve casing 17, the base of the conical portion forming a shoulder which abuts the outer face of said flange.

In order to firmly secure the anchor block 23 and torsion tube 18 against rotation in the housing 14 after adjustment, the flange 15 is recessed as at 25a adjacent the conical opening in the housing 14, to receive an annular projection 16a on the opposite face of flange 16 of the pilot valve casing. The depth of the recess 25a is greater than the thickness of the projection 16a so as to accommodate the shoulder of the anchor block 23 whereby the tightening of flanges 15 and 16 effects a firm grip on the conical end 25 of the anchor block.

The inner end of the anchor block 23 is squared as at 27 to receive a suitable wrench and projects into the pilot valve casing 17 as shown in Figs. 2 and 3 for adjusting the torsion on the tube 18 as will later appear, an opening and cover plate 40 being provided in the wall of the casing 17 for this purpose.

A valve rod 28 extends longitudinally through the torsion tube 18 in spaced relation thereto and is rigidly connected at one end to the adaptor 19, its other end extending through an adjusting arm mounting 29 to which it is secured by a set screw 30. The fixed end of the valve rod 28 is centered in the adaptor 19 and its opposite end is retained in proper alignment by means of a suitable ball bearing assembly 31 in the bore of the anchor block 23 thus preventing lateral displacement of the rod in operation.

The particular pilot valve structure illustrated in the drawings is simply an example of one form of valve which may be employed in connection with my invention, it being understood that I do not intend to limit myself to any specific valve structure. Referring to the pilot valve illustrated, it comprises a conventional bleed nozzle 32 interposed in an operating pressure line 33. A vane 34 pivotally secured to an arm 35 is disposed immediately in front of the nozzle 32 and is adapted to regulate the opening therein, for controlling the bleed of the operating pressure fluid to atmosphere. The movement of the vane 34 is effected by the adjusting arm 35 carried by the adjusting arm mounting 29 fixed to the end of the valve rod 28, an adjusting screw 36 and spring 37 being provided for regulating the operation of the vane 34.

A pressure reducing valve 38 may be provided in the operating pressure line 33 anterior to the pilot valve to avoid undue strain on the operating parts of the motor valve (not shown) connected to the discharge conduit 39 of the pilot valve unit, by limiting maximum transmitted pressure.

When my improved apparatus is installed for use in controlling the liquid level in a container or tank, the equalizing connections 2 on the float cage are connected to the proper points in the tank. The inlet end of the pressure line 33 is connected to a suitable source of operating pressure and the discharge end 39 is connected to the conventional motor valve which directly controls the discharge from or the input of liquid in the tank.

The torsion tube assembly is adjusted for operation by first removing the cover plate 40 in the top wall of the pilot valve casing 17 and loosening the bolts 15a in flanges 15 and 16. This relieves the grip of the torsion tube housing 14 on the conical end portion 25 of the anchor block 23 to permit relative rotation of the anchor block within the torsion tube housing. A wrench or other suitable tool is then applied to the squared end 27 of the anchor block through the opening in the top wall of the pilot valve casing 17 and the anchor block is turned in clockwise direction to adjust the torque on the torsion tube 18.

As before stated, the outer end of the torsion tube 18 is rigidly secured to the anchor block 23 and is thus rotatable therewith, its opposite end being rigidly secured to the pivoted float arm connection 10 which in turn supports the float arm 8 and float 9. The anchor block 23 is turned in clockwise direction until the torque of the torsion tube 18 is sufficient to merely support the float 9 off of the bottom stop of the float cage 1. The bolts 15a are then tightened to bring the end of the housing 14 tightly to bear against the conical end 25 of the anchor block, thus maintaining the adjustment of the torque.

In operation, any variation of the liquid being controlled is transmitted to the float cage 1 through the equalizing connections 2 and thus the float 9 is responsive to such variations. The float 9 may or may not be buoyant in the liquid by itself depending upon the nature of the installation. Preferably the float operates by variations in the effective weight of the float in the liquid, caused by variations in the submergence of said float in the liquid in the float cage. In other words, the torque in the tube 18 normally supports the float in the operative position thereby increasing the equivalent buoyancy of the float to such an extent that a variation in partial submergence of the float gives the necessary change in torque in the tube 18 to upset static equilibrium, thereby causing the torsion tube to rotate to a position of exerted torque for final equilibrium. A rise in the liquid level in the float cage 1 will give an equivalent increase in buoyancy thereby causing the torsion tube to rotate to such a position that the equilibrium of the exerted torque, the weight of the float, and the displaced weight of the liquid, are in balance.

The slightest movement of the float and float arm are transmitted directly to the pilot valve vane 34 by the valve rod 28 which operates through the torsion tube 18. The pilot valve unit 17 is connected through discharge conduit 39, in the conventional manner, to a motor valve (not shown) which directly regulates the level of the liquid in the container connected to the float cage 1. The inlet end of the operating pressure line 33 is connected to any suitable source of pressure. As before stated, the bleed nozzle 32 is interposed in the operating pressure line 33, the bleed to atmosphere being controlled by the operation of the float 9, float arm 8, valve rod 28, and the vane 34 operatively connected to the valve rod, variations in the pressure in line 33 caused by changes in the position of the vane 34 causing operation of the motor valve.

It will be apparent that I have provided a liquid level control mechanism which, while uneffected by pressure variations in the vessel being controlled, is extremely sensitive in operation, eliminates all friction and affords positive alignment of the valve operating rod. The torsion tube assembly provides a positive seal against leakage through the wall of the float cage and float arm housing without the use of a stuffing box or other packing. By control of the torque in the torsion tube, satisfactory operation may be obtained on any gravity of liquid or for interface control of two immiscible liquids. The apparatus may also be used to control the specific gravity of various liquids.

From the foregoing it is believed that my invention may be readily understood by those skilled in the art without further description, it being borne in mind that numerous changes may be made in the details of construction without departing from the spirit of the invention as set out in the following claims.

What I claim and desire to secure by Letters Patent is:

1. The combination with a float and float cage and a valve controlled by the movement of said float, means for transmitting the motion of said float to said valve through the wall of said float cage comprising a resilient tube operatively connected at one end to said float with its opposite end projecting through said float cage wall, a housing for said tube interposed between said float cage and said valve, an anchor block fixed to the projecting end of said tube, means for firmly securing said anchor block in longitudinal alignment with said housing, means for rotatably adjusting said anchor block to vary the torque in said tube, a rod extending longitudinally through said tube in spaced relation thereto, said rod being operatively secured to said float at one end, its opposite end projecting freely from said tube through said anchor block and being operatively connected to said valve.

2. In a device for transmitting motion from a movable element within a housing to motion utilizing means outside of said housing, comprising a resilient tube rigidly connected at one end to said movable element with its opposite end projecting through a wall of said housing, an anchor block fixed to the projecting end of said tube, means for locking said anchor block in tight engagement with said opening in said housing, means for rotatably adjusting said anchor block with respect to said housing whereby the torque in said tube may be varied, and a rod extending longitudinally through said tube in spaced relation thereto, said rod being rigidly secured to said movable element at one end, its opposite end projecting freely through said tube and anchor block and being rigidly secured to said motion utilizing means.

3. A liquid level controller including a container, an external valve for regulating the level of liquid in said container, an opening in one wall of said container, a valve rod operatively connected at one end to said valve with its opposite end extending through said opening, a float and float arm in said container responsive to variations of the level of the liquid therein, means rigidly connecting said float arm to said valve rod at right angles adjacent said opening, means pivotally supporting said float arm axially of said rod, a housing for said valve rod interposed between the casing of said valve and said container adjacent said opening, a resilient tube surrounding said valve rod in spaced relation thereto, said tube being rigidly secured at one end to said float arm, and means for anchoring the opposite end of said tube in said housing, whereby the weight of said float is supported by the torque of said tube, said last named means comprising an anchor block rotatably adjustable in the end of said housing whereby the torque of said tube may be varied.

4. In a liquid level control apparatus including a float cage operatively connected to a receptacle for the liquid to be controlled and an external valve and valve casing for controlling the level of the liquid in said receptacle, a valve actuating mechanism comprising a valve operating rod, a float arm, means directly connecting said float arm to one end of said rod at substantially right angles thereto, the other end of said rod being connected to said valve, a float suspended from the opposite end of said float arm in said float cage and responsive to variations of the level of the liquid in said receptacle, a float arm housing carried by said float cage, means rotatably supporting the connected ends of said float arm and valve rod in said housing, a supporting and protecting sleeve interposed between the end of said housing and said valve casing and terminating at its opposite ends in flanged connecting means, means for connecting the flanged ends to said housing and valve casing respectively, a resilient tube within said sleeve, surrounding said valve rod in spaced relation thereto, one end of said tube being rigidly connected to said float arm and valve rod connecting means but free from said sleeve, means for anchoring the other end of said tube to said sleeve while permitting freedom of movement of said valve rod, whereby movement of said float is transmitted directly to said valve through said valve rod, relative movement of said valve rod within said tube being permitted by the resiliency of the latter.

5. In a device for transmitting motion from a movable element within a housing to motion utilizing means outside of said housing, comprising a resilient tube rigidly connected at one end to said movable element with its opposite end projecting through a wall of said housing, an anchor block fixed to the projecting end of said tube and having a substantially conical ground surface at one end adapted to enage a complementary ground surface adjacent the opening in said housing, means for locking said anchor block in tight engagement with said opening, and a rod extending longitudinally through said tube in spaced relation thereto, said rod being rigidly secured to said movable element at one end, its opposite end projecting freely through said tube and anchor block and being rigidly secured to said motion utilizing means.

6. A device as claimed in claim 5 including means for rotatably adjusting said anchor block with respect to said housing whereby the torque in said tube may be varied.

7. In a device for transmitting motion from a movable element within a housing to motion utilizing means outside of said housing comprising a rotatable rod extending through an opening in said housing and connected at one end to said movable element and at its opposite end to said motion utilizing means, a resilient tube surrounding said rod in spaced relation, one end of said tube being rigidly sealed about said rod adjacent the point of connection to said movable member, its opposite end being free from said rod, a supporting and protecting sleeve surrounding said tube in spaced relation and extending between said housing and said motion utilizing means, an anchor block rigidly connected to the free end of said tube and forming a bearing for said rod, and means for fixedly securing said anchor block to said sleeve adjacent said motion utilizing means.

8. In a device for transmitting motion from a movable element within a housing to motion utilizing means outside of said housing, comprising a resilient tube rigidly connected at one end to said movable element with its opposite end projecting through a wall of said housing, anchoring means carried by the projecting end of said tube, means for firmly securing said anchoring means in alignment with the opening in said wall, means for rotatably adjusting said anchoring means to vary the torque in said tube, a rod extending longitudinally through said tube in spaced relation thereto, said rod being operatively secured to said movable element at one end, its opposite end projecting freely from said tube through said anchoring means and being operatively connected to said motion utilizing means.

LEON J. GRIFFEY.